May 21, 1963 R. A. EKSTROM, JR 3,090,231
INDICATING FLOWMETER WITH MAGNETIC MERCURY
SWITCHES FOR SIGNAL OPERATION
Filed June 20, 1958 2 Sheets-Sheet 1

INVENTOR.
Regner A. Ekstrom, Jr.
BY
Glenn H. Noble
Atty.

May 21, 1963  R. A. EKSTROM, JR  3,090,231
INDICATING FLOWMETER WITH MAGNETIC MERCURY
SWITCHES FOR SIGNAL OPERATION
Filed June 20, 1958  2 Sheets-Sheet 2
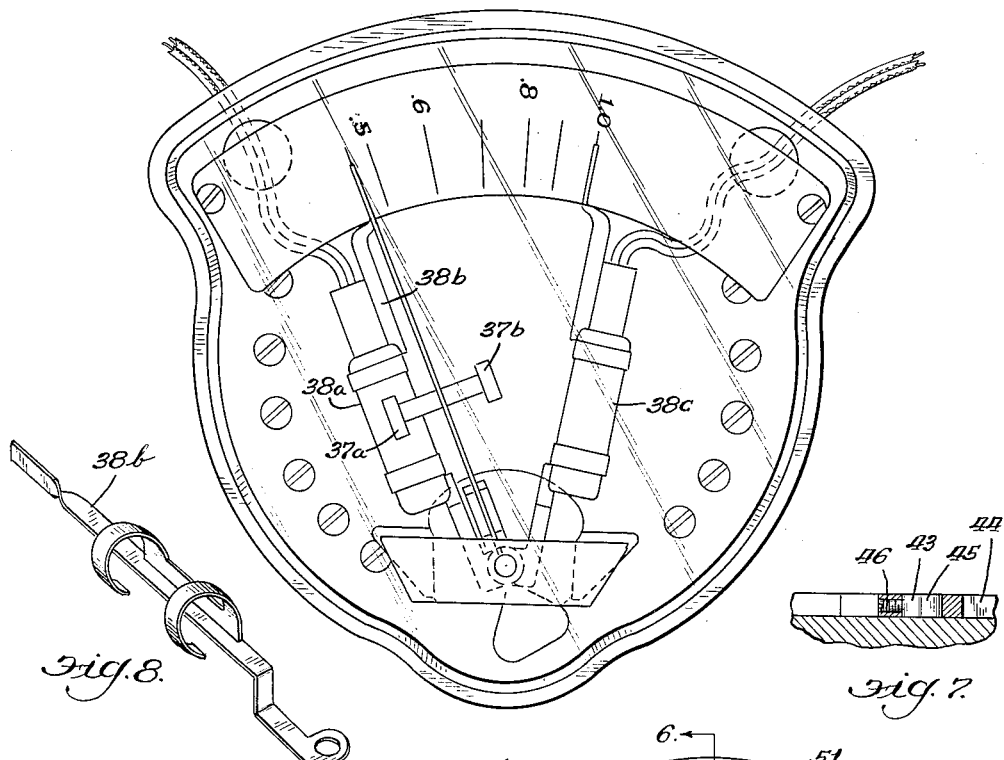
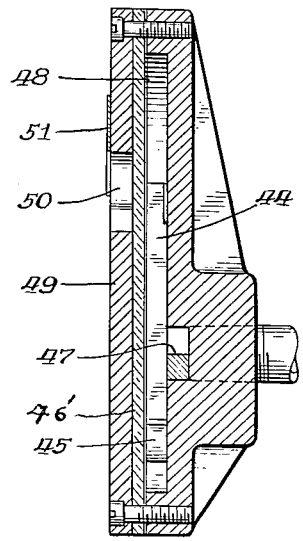
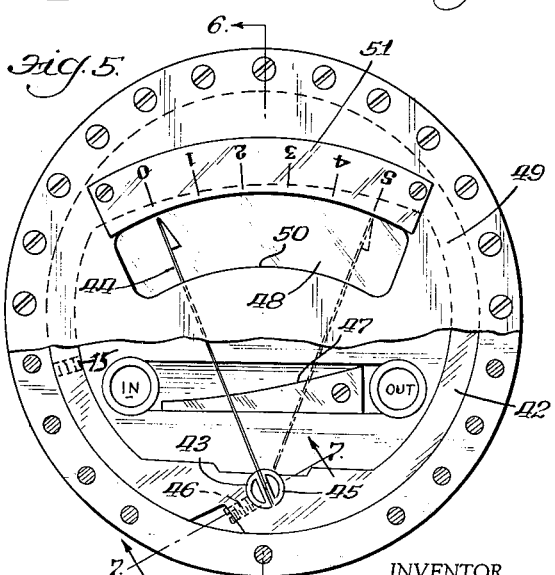
INVENTOR.
Regner A. Ekstrom, Jr.
BY
Glenn W. Noble
Atty.

United States Patent Office 3,090,231
Patented May 21, 1963

3,090,231
INDICATING FLOWMETER WITH MAGNETIC MERCURY SWITCHES FOR SIGNAL OPERATION
Regner A. Ekstrom, Jr., 15555 Millard, Markham, Ill.
Filed June 20, 1958, Ser. No. 743,383
6 Claims. (Cl. 73—228)

This invention relates to flowmeters adapted for measuring the flow of various substances from gases to more or less viscous fluids and also provides means for increasing the use of flowmeters for operating various devices.

Among the objects of the invention are to provide a flowmeter which can be manufactured economically and which will be particularly effective in operation, and which will be adaptable for measuring fluids either under low pressure or extremely high pressures; to provide a flowmeter with an insert for carrying various parts of the instrument; to provide an improved vane for a flowmeter; and to provide such other advantages and improvements as will appear more fully hereinafter.

In the accompanying drawings illustrating this invention,

FIG. 4 is a view similar to FIG. 1 showing a modification.

FIG. 5 is a detail showing a further modification.

FIG. 6 is a sectional view taken on the line 6—6 of FIG. 5;

FIG. 7 is a detail taken on the line 7—7 of FIG. 5; and

FIG. 8 is a view of a switch carrying arm.

Figure 1:
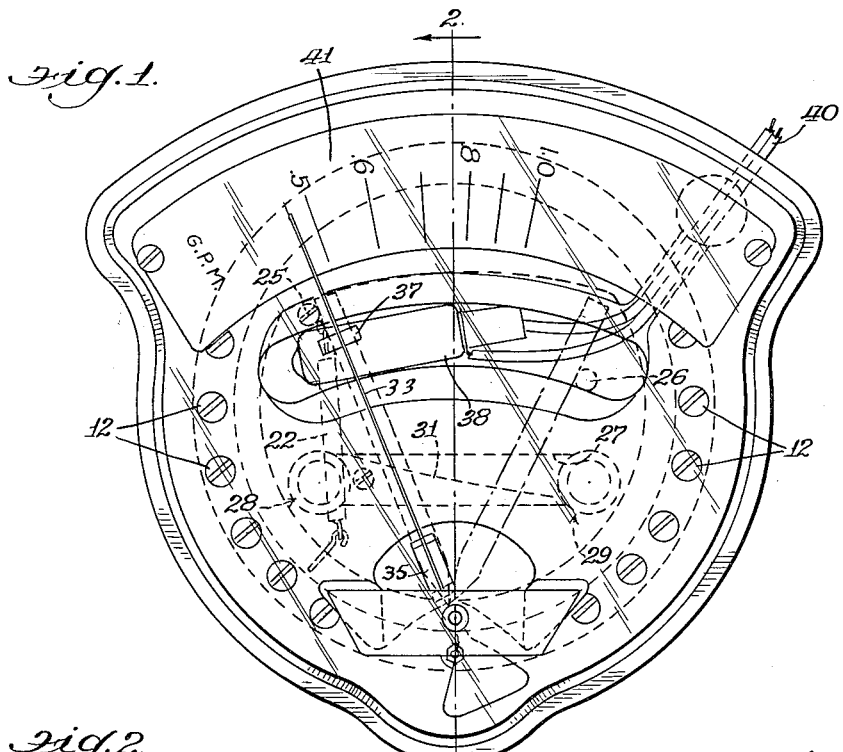
FIG. 1 is a front view of the flowmeter shown with certain controlling units.
Figure 2:
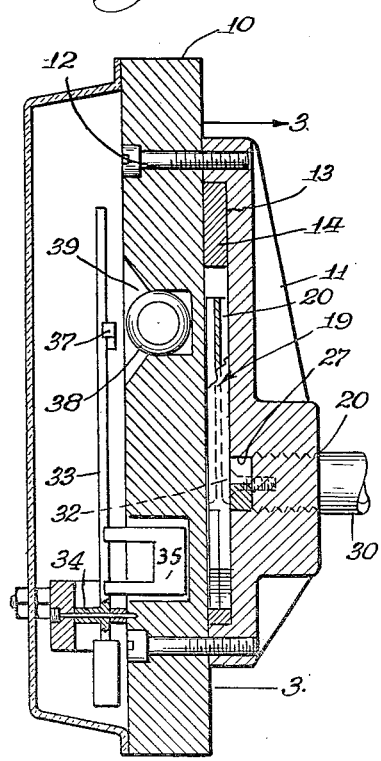
FIG. 2 is a sectional view taken substantially on the line 2—2 of FIG. 1.
Figure 3:
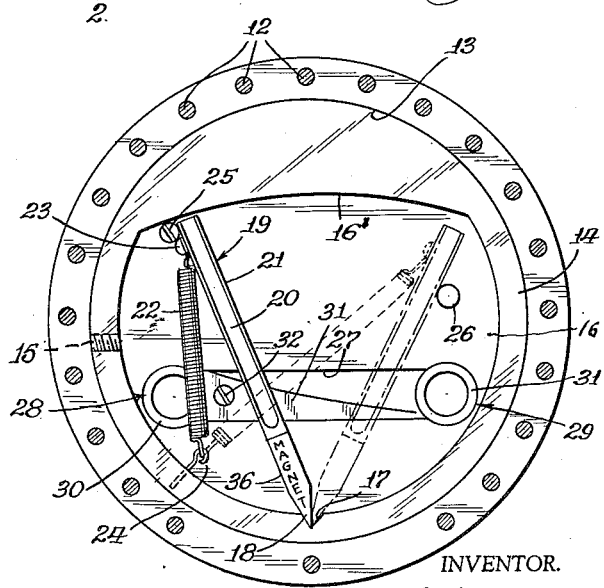
FIG. 3 is a sectional view taken on the line 3—3 of FIG. 2 and showing the mounting of the bar vane, and also the insert in which that vane is mounted.

In order to provide for measuring fluids under high pressure, the meter is provided with a relatively thick heavy front plate 10 and a somewhat lighter back plate 11 which is secured to the front plate by a plurality of screws 12 depending in number and size upon the pressures to be encountered. The back plate or housing member 11 has an annular recess or depression, forming a cylindrical chamber 13 for receiving an insert 14 having a circular periphery which fits within the recess and which is of sufficient thickness to fit closely between the bottom of the recess and the back of the front plate as best shown in FIGS. 2 and 3. The insert is held in position by a set screw 15. The insert has a central opening 16 which is circular throughout the main portion thereof but which has an arcuate shaped portion 16', the center of which is substantially below the center of the insert as shown in FIG. 3.

The lower innermost wall of the insert has a V-shaped notch 17 for receiving the knife edge end 18 of the vane 19. The vane is of substantially rectangular cross section with the central portions of the opposite sides cut away at 20 to provide knife edges 21 which will move freely with very little resistance. The vane is held in operative position by spring 22, one end of which is fixed at 23 to the outer end of the vane. The other end of the spring is connected at 24 to the inner wall of the insert. The back of the front plate is provided with stops 25, 26 for limiting the movement of the vane as shown in FIG. 3.

The inner face or surface of the back member has a channel or depression 27 which has an intake 28 at one end and an outlet 29 at the opposite end to which are connected the fluid conduits such as pipes 30 and 31.

As will be explained hereinafter, the channel or groove 27 may be left open, but I prefer to have a tapered bar or dam member 31 inserted therein as shown in FIG. 3 and held by means of a screw 32. This member is practically of the same height as the depth of the channel and at one end is as wide as the channel but tapers away therefrom as shown.

In order to indicate the flow, a hand or pointer 33 is pivotally mounted at 34 to the front plate 10 as shown in FIG. 2. The axis of the pivot is practically in alignment with the V-slot in the insert and the pointer extends upwardly. It is provided adjacent to the pivot with a magnet 35 which coacts with the magnet 36 in the end of the vane whereby the pointer will follow the movement of the vane.

The pointer is also provided with a second magnet 37 to actuate electric switches for control purposes such as opening or closing electric circuits for machines, or the like. In the arangement shown, I provide a mercury switch such as a mercoid magnet operated mercury switch or a similar device 38 which is mounted in a recess 39 in the face plate 10, and which is provided with outward wires 40 which may lead to any desired instrument for operating the same. Such mercury switches are provided with the switch closed or with the switch open and may be operated by the presence of the magnet adjacent thereto such as the magnet 37 when it passes over the mercury switch during its travel or when it is in a given position with respect to the same.

It will be seen that when the fluid enters the meter, it first acts against the entire surface of the vane, being substantially stopped from passing through the channel or groove 27. However, as the vane moves, under the action of the fluid flow, it will swing over and open a gradually increasing space in the channel or groove due to the tapering of the tapered bar. It will also be noted that the area of the passageway may be reversed by reversing the position of the tapered bar so that the small end is adjacent to the inlet. Simultaneously there will be an increased space between the vane and the curved wall portion 16' of the insert.

From this, it will be seen that by properly proportioning the different elements, the flow may be accurately measured and the face plate may be calibrated as shown at 41 to indicate the amount of fluid passing through the meter.

The operating characteristics of the form shown in FIG. 4 are substantially the same as above described, but in this instance, provision is made for using an adjustable mercury switch or a plurality of such switches. In some cases, it is desirable to provide means for actuating a device or a signal when there is low flow or when there is high flow or at some intermediate point. For instance, it may be desired to start a motor when the meter is at low flow and stop the same when the meter is at high flow or vice versa. For this purpose, the mercury switch 38a is mounted on a supporting arm 38b which is pivotally mounted at one end adjacent to the pivotal point of the vane. The wires from the switch are sufficiently flexible to permit the movement of the same. The drawing shows the switch positioned at low pressure, but by swinging the supporting arm, it may be adjusted to any flow. Likewise, a second mercury switch 38c is mounted on a similar arm and pivoted in the same way as the first switch and both arms extend out where they will register with the calibrations.

By means of this arrangement, the switch 38a may be positioned so that the magnet 37a on the pointer will operate it at any desired point and a similar magnet 37b will operate the mercury switch 38c at any desired point.

This provides means for accurately controlling different operations or different mechanisms.

In the modified form as shown in FIGS. 5–7, the casing insert and fluid connections are the same as described, but in this instance, the insert 42 is provided with a recess 43 in the lower part of the inner periphery for mounting a spring vane 44. The vane is held in adjusted position by means of hollow wedges 45 an a set screw 46. The vane coacts with the curve of the insert the same as in the first form and which provides a gradually increasing space at the end of the vane as it moves under the influence of the fluid. The wedge-shape baffle 47 is positioned reversely from the similar element shown in FIG. 3.

In this form of the device, the spring vane also serves as the pointer for indicating the flow and a glass cover 46' is provided with a main cover 49. The main cover which is preferably made of suitable metal has an opening or window 50 so that the pointer may be observed in connection with the calibration 51.

Attention is called particularly to the fact that all of the forms of the invention utilize the circular insert which is especially important for manufacturing purposes. In many cases, the meters have to be made of special metals such as stainless steel which is exceedingly difficult to work. The circular insert can be machined far more easily than could the same outlines be made in a heavy stainless steel body. It is also of particular importance to have the insert and all the operating parts secured together so that they may be separately calibrated and may be readily inserted in the bodies or may be readily changed for different capacities and fluid characteristics.

Having thus described my invention, what I claim is:

1. A flowmeter having a body formed of a front plate and a rear plate, the rear plate having a cylindrical chamber, an insert mounted in the chamber, an inlet and an outlet for said chamber, the insert having a substantially circular inner wall with an arcuate portion of greater radius of curvature than that of the remainder of the said inner wall and being curved progressively away from the center of the insert, said inner wall having a V-shaped notch opposed to the arcuate surface, a substantially rectangular vane having a knife-edge at one end engaging with said notch to form a pivot with its free end adapted to swing along the arcuate surface, a spring having one end secured to the vane and the other end secured to the insert for holding the vane in position down in the slot and providing tension against its movement, a magnet secured to the vane, a pointer pivotally mounted on the outside of the body plate, and a magnet on the pointer which coacts with the magnet on the vane to move the pointer in accordance with the movement of the vane.

2. A device as per claim 1 in which said vane has grooved sides forming substantially knife-edges for contact with the adjacent body surfaces.

3. In a flowmeter, the combination of a body portion having a cylindrical chamber, an insert fitting in said chamber, means for holding the insert in position, the insert having a central opening which is substantially circular throughout the main portion thereof and with an arcuate shaped portion which is curved progressively away from the center of the insert, means forming an inlet and outlet to the said chamber, said inner wall having a notch formed therein opposed to the arcuate portion, a vane having a knife-edge at one end engaging with said notch and extending out toward the arcuate portion, a spring biased to hold the vane in the slot and in starting position, a magnet on the vane, a pointer pivotally mounted on the outer face of the body portion, and a magnet on the pointer which coacts with the magnet on the vane for moving the pointer.

4. A flowmeter consisting of a plate, a housing secured thereto and having a cylindrical recess therein, an insert having a circular periphery which fits in the recess, means for holding the insert in position, the insert defining a central measuring opening, a vane operatively mounted to move angularly about one end in said opening, means tending to hold the vane downwardly about said end and to one side of said opening, a magnet mounted on the vane, a pointer pivotally mounted on the plate, a magnet on the pointer which coacts with the magnet on the vane for moving the pointer in accordance with the flow, adjustable arms pivoted adjacent to the pointer pivot at the limits of the pointer movement, an adjustable magnetic mercury switch carried by each of the arms actuated by the magnet on the pointer at the end of its movement in either direction and inlet and outlet openings to the measuring area.

5. A flowmeter in accordance with claim 4 in which the housing member has a channel extending from the inlet to the outlet, and means for varying the flow capacity of the channel comprising a tapered baffle plate mounted in said channel with screw means for adjusting the baffle plate to vary the opening in the channel to affect the flow therethrough.

6. A flowmeter having a casing with a cylindrical chamber therein, an annular fitting in said chamber and defining a measuring element, a vane with a knife edge bearing at one end and said inner wall having a notch formed therein in which the knife edge of the vane is mounted, a coil spring connected at one end to the outer unmounted portion of the vane and connected at the other end to the insert tending to hold the vane downwardly in the notch and toward the inlet side of the chamber, and said chamber having an inlet on one side of the vane and an outlet on the other side of the vane.

References Cited in the file of this patent

UNITED STATES PATENTS

| | | |
|---|---|---|
| 1,111,684 | Vaughan | Sept. 22, 1914 |
| 1,574,460 | Williamson | Feb. 23, 1926 |
| 2,296,973 | Ardelt | Sept. 29, 1942 |
| 2,346,121 | Weckerly | Apr. 4, 1944 |
| 2,355,694 | Ardelt | Aug. 15, 1944 |
| 2,385,901 | Williams | Oct. 2, 1945 |
| 2,600,309 | MacDonald et al. | June 10, 1952 |
| 2,734,107 | Reichel | Feb. 7, 1956 |
| 2,892,348 | Ekstrom | June 30, 1959 |

FOREIGN PATENTS

| | | |
|---|---|---|
| 767,241 | Canada | Jan. 30, 1957 |